MAGNETICALLY REGULATED VARIABLE HIGH VOLTAGE POWER SUPPLY
Filed Sept. 11, 1961
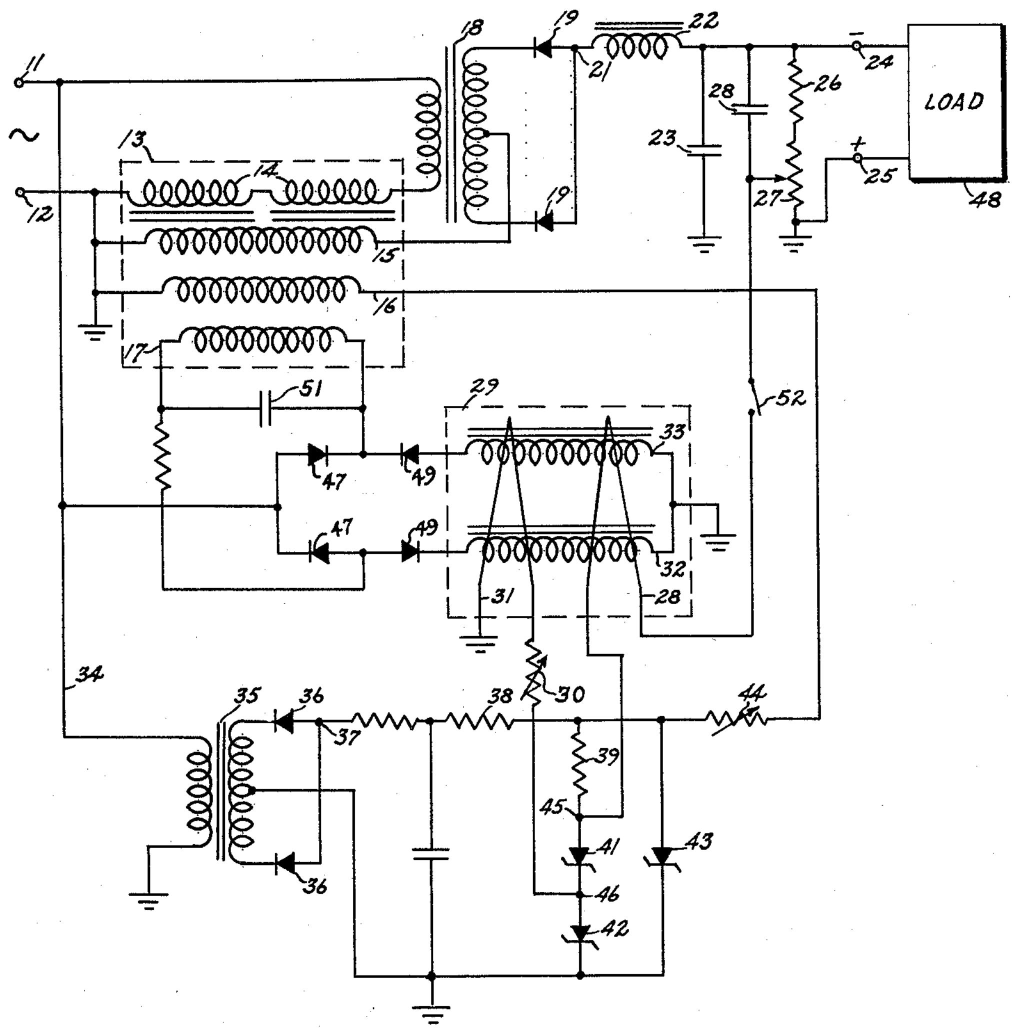
INVENTORS
ROBERT B. WALLACE
WALTER L. WUSTER
BY
H. H. Losche
ATTORNEYS 3,098,193
Patented July 16, 1963

3,098,193

MAGNETICALLY REGULATED VARIABLE HIGH VOLTAGE POWER SUPPLY

Robert B. Wallace and Walter L. Wuster, Indianapolis, Ind., assignors to the United States of America as represented by the Secretary of the Navy Filed Sept. 11, 1961, Ser. No. 137,446
1 Claim. (Cl. 323—66)
(Granted under Title 35, U.S. Code (1952), sec. 266)

The invention described herein may be manufactured and used by or for the Government of the United States of America for governmental purposes without the payment of any royalties thereon or therefor.

The present invention is generally related to improvements in electrical power supplies and the like and more particularly to new and improved circuitry for magnetic regulation of variable high voltage, high current power supplies wherein saturable reactors, magnetic amplifiers, and voltage reference diodes are utilized in conjunction with various control circuitry to provide a novel, completely solid state regulated power supply wherein all control circuitry operates at low voltage.

Those engaged in the development of modern electronics equipment, both commercial and military, have for some time expressed a need for a high voltage, high current power supply having close regulation and at the same time offering a wide range of operating voltages. Such a supply must necessarily possess considerable ruggedness and stability in order to perform satisfactorily under the most extreme commercial and military environmental conditions, since it will doubtlessly find wide application in high performance commercial and military aircraft and space vehicles and military field equipment, which of necessity must operate throughout a wide range of environmental conditions. Supply units presently available having a satisfactory degree of regulation lack the ability to supply a sufficiently wide range of output voltages and have a limited life due to the use of comparatively fragile vacuum tubes in some portion of the control circuitry; if transistors are utilized in place of vacuum tubes, problems arise due to increased cost and high thermal drift under the extreme environmental conditions encountered by military field equipment.

The present invention overcomes these disadvantages of the prior art by utilizing novel low voltage control circuitry to provide a closely regulated high voltage, high current power supply offering a relatively wide range of supply voltages without incorporating therein limited life or easily damaged elements such as vacuum tubes and transistors. To attain these features of close regulation, wide voltage range, ruggedness, stability, and long life, the present invention contemplates a unique, completely solid-state, magnetically regulated power supply arrangement wherein a saturable reactor having a plurality of current summing windings is closely controlled by a magnetic amplifier reference circuit which, by varying the current in a summing control winding of the saturable reactor in proportion to any tendency toward change in the supply load voltage, changes the effective impedance presented by the reactor to the flow of current in the primary winding of a high voltage transformer. This variation in effective impedance causes a change in the current flowing in the primary winding of the transformer resulting in a variation in the voltage induced in its secondary winding in such a manner as to maintain the supply load voltage at the desired level irrespective of changes in the effective impedance of applied load or variations in the alternating current line voltage.

An object of the present invention is the provision of a closely regulated high voltage, high current power supply.

Another object is to provide a new and improved magnetic amplifier-saturable reactor low voltage control circuit for regulating a high voltage, high current power supply.

A further object of the invention is the provision of a magnetically regulated power supply having increased ruggedness, stability, and initial life expectancy.

Still another object is to provide a completely solid state, magnetically controlled high voltage, high current power supply having a high degree of regulation and yet offering a wide range of output supply voltages.

Yet another object of the present invention is the provision of a completely solid state, closely regulated, magnetically controlled power supply offering satisfactory performance over a wide range of environmental conditions.

Other objects and many of the attendant advantages of this invention will be readily appreciated as the same becomes better understood by reference to the following detailed description of a preferred embodiment of the invention as schematically illustrated in the accompanying FIGURE of drawing.

Referring now to the FIGURE of drawing there is shown a specific embodiment of the invention in which an alternator provides an alternating current (A.C.) voltage to power supply input terminals 11 and 12, one of which is coupled through the "gate" or load windings 14 of a saturable reactor 13 to an end terminal of the primary winding of a high voltage step-up transformer 18 which has its other end terminal coupled directly to the remaining power supply input terminal. Saturable reactor 13 has a plurality of current summing control windings 15, 16, and 17, of which winding 15 is sensitive to the load current, winding 16 acts as a bias winding, and winding 17 is sensitive to the supply output voltage. The center-tapped secondary winding of transformer 18 has each of its end terminals coupled through diode rectifying means 19 to a common terminal point 21 which is further coupled through ripple-reducing inductance 22 and associated capacitance 23 to negative output terminal 24 for coupling to load 48. A current path can be traced from output terminal 24 through any suitable load 48 to grounded positive output terminal 25, via ground to current-sensitive control winding 15 of saturable reactor 13, through winding 15 to the center tap on the secondary winding of transformer 18, through the respective halves of the secondary winding and associated diode rectifiers 19 to terminal point 21, then via inductance 22 back to output terminal 24. Resistance 26, capacitance 28, and potentiometer 27 provide a means to constantly obtain a reference potential proportional to the output voltage present across supply output terminals 24 and 25. The adjustable arm of potentiometer 27 is coupled via switch 52 to an end terminal of control winding 28 of magnetic amplifier 29, the other end terminal of winding 28 being coupled to a source of constant reference potential at terminal point 45. Magnetic amplifier 29 is composed of load windings 32 and 33 with respective associated saturating control diode means 49, bias winding 31, and previously mentioned control winding 28. A transformer 35 with a primary winding having one end coupled to input terminal 11 via conductor 34 and the other end coupled to ground, and a center-tapped secondary winding having each of its end coupled through respective diode rectifying means 36 to a common terminal point 37 with the center tap being coupled to ground forming a full wave rectifying configuration, supplies a direct current (D.C.) potential via voltage dropping resistances 38 and 39 to Zener reference diodes 41, 42, and 43. Zener diodes 41 and 42 provide sources of constant potential at terminal points 45 and 46, respectively. Bias winding 16 of saturable reactor 13, and associated variable voltage dropping resistance 44 in series therewith, is connected across reference diode 43 to maintain a constant bias voltage across winding 16, and consequently, a constant current therethrough in order to establish a minimum level of saturation in the core of reactor 13, thereby determining the maximum level of impedance desirable for load windings 14 to present to the alternating current flowing in the primary winding of transformer 18. Diode rectifying means 47 permit magnetic amplifier 29 to supply its output to a direct current load in the form of control winding 17 of saturable reactor 13. Capacitor 51 serves as a bypass for second harmonic frequencies of the A.C. magnetic amplifier energizing voltage which would otherwise establish a disturbing current flow through control winding 17. Bias winding 31 of magnetic amplifier 29 has one of its end terminals coupled to ground and the other coupled via variable resistance 30 to constant reference potential point 46.

*Operation*

The operation of the invention occurs in the following manner. An A.C. voltage is supplied to input terminals 11 and 12 by a suitable source not shown. This voltage causes an alternating current to flow from input terminal 11 through the primary winding of high voltage step-up transformer 18 and the "gate" or load windings 14 of saturable reactor 13 back to input terminal 12. This alternating current flowing in the primary winding of transformer 18 causes an A.C. voltage to be induced into the secondary winding thereof. This voltage is rectified by diodes 19 so that a high negative potential with respect to grounded terminal 25 is present at terminal 24. Thus a high negative D.C. voltage is provided to load 48 which might be a traveling wave tube or any other suitable load necessitating such a voltage. This high negative D.C. voltage establishes a current flow which, according to convention, can be said to follow a path from grounded positive output terminal 25 through load 48 to negative terminal 24, then via filter inductance 22 and alternately conducting diodes 19 to respective ends of the secondary winding of transformer 18 and back to grounded terminal 25 via the secondary winding center tap and load current sensitive control winding 15 of saturable reactor 13. It is to be understood that although the embodiment of the invention depicted in the FIGURE of drawing provides a high negative potential with respect to ground at its output terminal 24, it is certainly within the scope of this invention to reverse the various diode polarities in such manner as to enable the disclosed embodiment to provide a regulated output voltage of high positive potential with respect to ground at terminal 24.

Regulation of this high potential present across terminals 24 and 25 is obtained in the following manner. Initially, with switch 52 to magnetic amplifier 29 open and with load 48 removed from output terminals 24 and 25, the direct current in bias winding 16 is adjusted by means of variable resistance 44 to provide a level of saturation in the core of reactor 13 sufficient to decrease the effective impedance which windings 14 exhibit to the alternating current flowing in the primary winding of transformer 18 to the maximum which will be necessary for the control of any one value of regulated output voltage. This level of saturation due to the direct current flowing in bias winding 16 should be made sufficient to reduce the impedance of gate windings 14 to a value which will permit an alternating current to flow in the primary winding of transformer 18 of such magnitude as to provide approximately 80 to 95 percent of the desired regulated no-load voltage at output terminals 24 and 25. During this period of initial adjustment of bias winding 16, switch 52 is kept open as previously stated thereby preventing a direct current flow in control winding 28 which would otherwise exist. Through adjustment of variable resistance 30, a D.C. potential is placed across bias winding 31 of self-saturating magnetic amplifier 29 from reference diode 42 sufficient to provide a direct current flow therethrough of such magnitude and direction as to completely desaturate the respective cores of load windings 32 and 33 immediately following their alternate saturation by the A.C. supply voltage via conductor 34. Thus so long as no D.C. control current flows in control winding 28 to oppose the bias current in winding 31, i.e., when switch 52 is open to enable bias winding 16 to be adjusted, magnetic amplifier 29 is "biased off" and no D.C. load current flows in control winding 17 of saturable reactor 13. After this initial adjustment of bias current in winding 16, switch 52 is closed permitting the difference in potential between reference point 45 and the adjustable arm of output voltage sampling potentiometer 27 to establish a direct current flow in control winding 28 which opposes that in bias winding 31 and decreases the level of opposing saturation in the cores of load windings 32 and 33 causing a direct current to flow in control winding 17 of saturable reactor 13 proportional to the current flow in winding 28, thereby increasing the saturation of the core of reactor 13 and allowing an increase in the alternating current flow through the primary winding of transformer 18 which increases the output voltage at terminals 24 and 25. Potentiometer 27 is adjusted to provide the proper amount of D.C. control current in winding 28 to obtain the desired value of no-load voltage across terminals 24 and 25. The power supply is now adjusted and ready for coupling to the load.

As load 48 is coupled to output terminals 24 and 25, a flow of direct current is established therethrough having a magnitude proportional to the effective impedance of the load. This direct current flows from the center tap of the secondary winding of transformer 18 via winding 15 of saturable reactor 13 to output terminal 25 and load 48, returning via terminal 24, inductance 22, and diodes 19 to transformer 18. This current flow tends to reduce the desired difference in potential between output terminals 24 and 25; however, this same current flow in passing through winding 15 of reactor 13 increases the level of saturation of its core thereby permitting an increase in the flow of alternating current in the primary winding of transformer 18 which, in turn, increases the magnitude of the voltage induced in the secondary winding thereof resulting in an increase in the difference in potential between terminals 24 and 25. Thus it can be seen that a variation in the effective load impedance which results in a change in D.C. load current and consequently a tendency toward variation in the output voltage to be regulated, causes a shift in the level of saturation of the core of reactor 13 due to the change in current flow in winding 15 which tends to furnish the major portion of compensation necessary in the effective impedance of load windings 14 to maintain the desired regulation of the output voltage. Any small degree of over or under compensation by winding 15 is sensed at potentiometer 27 as a deviation in potential from the initially established value which causes a variation in the amount of direct current flowing in control winding 28 of magnetic amplifier 29 which, in turn, causes a variation in the D.C. load current supplied to control winding 17 of saturable reactor 13 to readjust the effective impedance of load windings 14 in order to correct and maintain the D.C. output voltage at terminals 24 and 25 at the desired level. It should be clear from the foregoing description that load current sensitive control winding 15 and output voltage sensitive control winding 17, of saturable reactor 13, perform complementary functions in order to maintain the desired value of regulated output supply voltage at terminals 24 and 25 of the invention, winding 15 providing the major portion of compensation necessary and winding 17 supplementing this compensation with the additional critical adjustment required.

Thus it becomes apparent from the foregoing description and annexed drawing that the invention, a versatile, highly reliable, solid-state magnetically regulated high voltage power supply, is a useful and practical device having many applications in the field of electronics. The usefulness of the device is enhanced by its reliability and long service-free life expectancy resulting from its use of low potential control voltages and solid-state control circuitry throughout, and its wide range of closely regulated output voltages established by variable resistance 44 and potentiometer 27.

Obviously many modifications and variations of the present invention are possible in the light of the above teachings. It is therefore to be understood, that within the scope of the appended claim, the invention may be practiced otherwise than as specifically described.

We claim:

A completely solid-state, magnetically regulated, low voltage controlled, high voltage power supply comprising: an alternating current potential source having first and second terminal means for providing power to a load; a saturable reactor having at least a gate winding, a bias winding, a first load current sensitive control winding, and a second load voltage sensitive control winding, said gate winding having an end terminal thereof coupled to said first terminal means of said alternating current potential source, and said bias winding having one end terminal coupled to ground potential and the other end terminal coupled via a variable impedance to a first source of constant direct current reference potential; a high voltage transforming means having primary and center-tapped secondary windings, said primary winding having one end terminal thereof coupled to said second terminal of said alternating current potential source for receiving an alternating current and the other end terminal thereof coupled to the other end terminal of said gate winding of said saturable reactor for regulating the current flow through said primary winding, and said secondary winding having its center tap coupled to an end terminal of said first load current sensitive control winding of said saturable reactor and each of its end terminals respectively coupled through diode rectifying means to a common terminal point to form a full wave rectifying configuration; a ripple reducing filter means for filtering the full-wave rectified voltage from said secondary winding having a first input terminal coupled to said common terminal point and a second input terminal coupled via ground to the other end terminal of said first load current sensitive control winding of said saturable reactor, and having first and second output terminals for supplying a ripple-free direct current voltage to a load; a suitable load having first and second input terminals for receiving a direct current potential respectively coupled to said first and second output terminals of said filter means; an output voltage sensing means coupled across said first and second output terminals of said filter means; a self-saturating, gain-producing magnetic amplifier for supplying a direct current potential to a load, having first and second input terminals coupled respectively to said first and second terminal means of said alternating current potential source for receiving an energizing potential, having first and second output terminals coupled respectively to the end terminals of said second load voltage sensitive control winding of said saturable reactor for supplying a control current thereto, having a bias winding coupled in series with a variable resistance to a second source of constant direct current reference potential for providing the desired operating point in said magnetic amplifier, and having a control winding with one of its end terminals coupled to a third source of constant direct current reference potential and the other end terminal coupled to said output voltage sensing means to enable said magnetic amplifier to control the amount of direct current supplied to said second load voltage sensitive control winding of said saturable reactor which, in co-operation with the current in said first load current sensitive control winding, controls the effective impedance of said saturable reactor in the primary circuit of said voltage transforming means to thereby regulate the high direct current potential supplied to said suitable load.

References Cited in the file of this patent

UNITED STATES PATENTS

| | | |
|---|---|---|
| 1,834,416 | Osgood | Dec. 1, 1931 |
| 2,869,069 | Wright | Jan. 13, 1959 |
| 2,985,767 | Janonis | May 23, 1961 |